Jan. 10, 1933.  A. H. ELLIS  1,894,233
AUTOMOBILE ATTACHMENT
Filed May 12, 1931   2 Sheets-Sheet 1
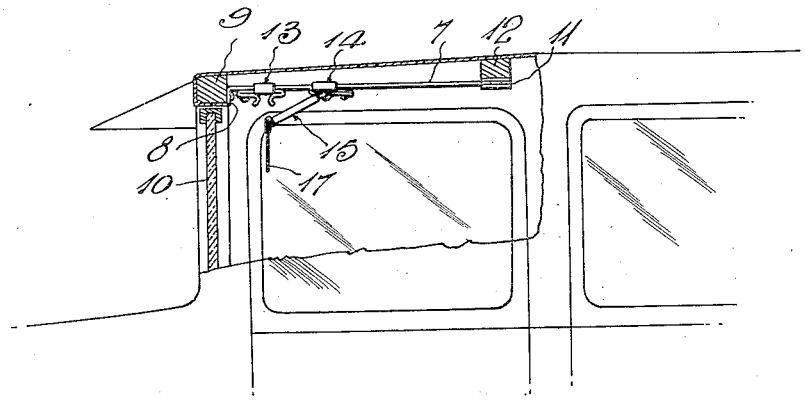
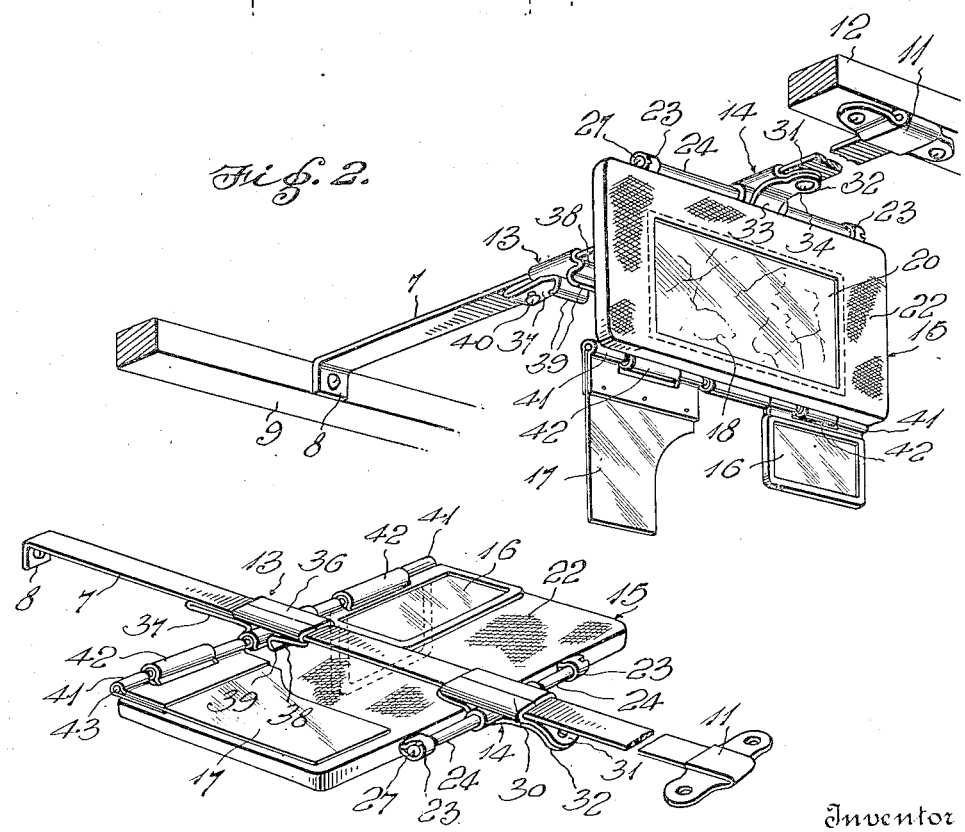
Witness
H. Woodard
Inventor
Arthur H. Ellis

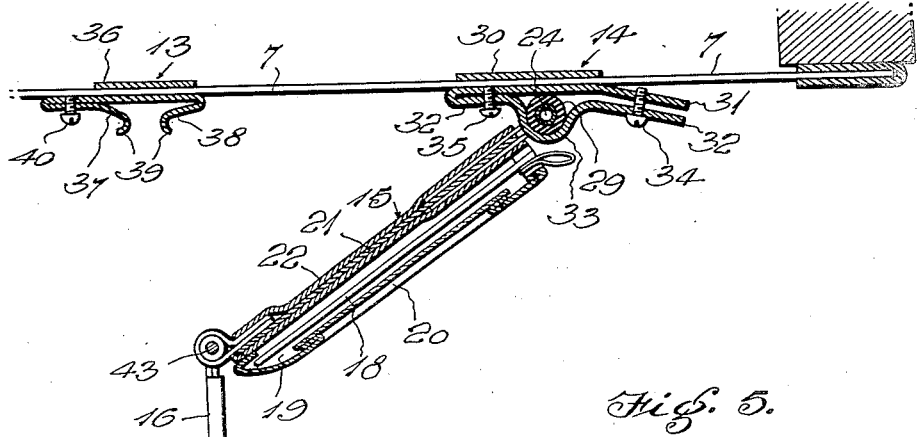
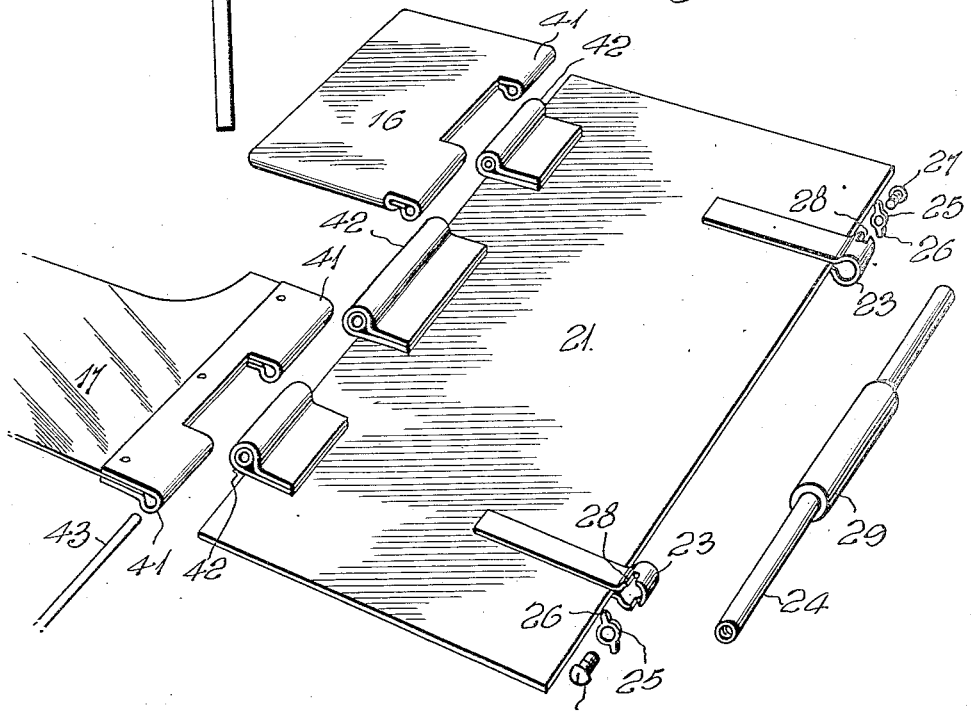

Patented Jan. 10, 1933

1,894,233

UNITED STATES PATENT OFFICE

ARTHUR H. ELLIS, OF ROCHESTER, MINNESOTA, ASSIGNOR OF ONE-HALF TO ROCHESTER APPLIANCE COMPANY, OF ROCHESTER, MINNESOTA, A CORPORATION OF MINNESOTA

AUTOMOBILE ATTACHMENT

Application filed May 12, 1931. Serial No. 536,907.

The invention aims to provide a novel attachment adapted for mounting immediately under the ceiling of an automobile body to act as a sun visor, to carry a map, a glare shield and a traffic mirror, and to permit such setting of any of the elements as to best suit the driver's convenience.

With the foregoing in view, the invention resides in the novel subject matter hereinafter described and claimed, description being accomplished by reference to the accompanying drawings.

Fig. 1 is a side elevation partly broken away and in section, showing the invention applied.

Fig. 2 is a perspective view showing the map-carrying panel, the glare shield and the traffic mirror all swung downwardly.

Fig. 3 is a perspective view showing the map-carrying panel held in an upwardly swung position and showing the glare shield folded upon the upper side of said panel.

Fig. 4 is an enlarged longitudinal sectional view through the parts positioned as seen in Fig. 1.

Fig. 5 is a disassembled perspective view showing a number of the elements of which the attachment may be composed.

Fig. 6 is a sectional view through a detail which will be hereinafter described.

A preferred construction has been illustrated and will be rather specifically explained, with the understanding however that within the scope of the invention as claimed, variations may be made.

The numeral 7 on the drawings denotes a flat bar whose front end is provided with an attaching lug 8 for anchorage to the front top sill 9 immediately over the windshield 10 of an automobile body. The rear end of the bar 7 is received in a suitable socket 11 which is secured to one of the transverse bows 12 of the top. The bar 7 is thus mounted immediately under the ceiling of the car body as will be clear from Fig. 1. From this view, however, the conventional ceiling lining has been omitted.

Movable forwardly and rearwardly to different positions upon the bar 7, are a front slide 13 and a rear slide 14. Hinged to the slide 14 is a panel 15 which may be swung to a forwardly declined position or to a substantially vertical position to obstruct sun rays which would otherwise reach the driver's eyes. This panel 15 is of course opaque.

Hinged to the lower edge of the panel 15, is a traffic mirror 16 and a translucent glare shield 17, and by swinging said panel 15 to the required extent and swinging the parts 16 and 17 about their hinges, they may be set at the most convenient locations. When the glare shield 17 is not needed, it may be folded against the upper or front side of the panel 15, and when this panel is not needed to shield the driver's eyes from sun, it may be swung upwardly to the position shown in Fig. 3, said panel and the slide 13 being provided with co-acting yieldably engaged means for holding the panel raised whenever desired. Whether the panel 15 be raised or lowered, the traffic mirror 16 may hang downwardly for convenient use.

In addition to acting as a sun visor, the panel 15 preferably carries a map 18 which may either be a route map or a map of the territory in which the owner of the machine resides, and may obviously be any other map if desired. This map is held in a pocket 19 with which the panel 15 is provided, said pocket having an opening 20 covered with celluloid or the like to expose the map to view and at the same time protect it.

The panel 15 could of course be constructed in any of various ways. For illustrative purposes, I have shown it embodying a rigid sheet metal plate 21 covered with fabric or the like 22, a portion of which forms the pocket 19. One edge of the plate 21 is provided near its ends with hinge knuckles 23 which receive the ends of a shaft 24, said knuckles and shaft being secured together in any suitable way. In the present showing, washers 25 having radial projections 26, are secured by screws 27 to the ends of the shaft 24, said projections 26 being received in notches 28 in the knuckles 23.

The intermediate portion of the shaft 24 is provided with a yieldable sleeve 29 preferably formed from a short length of rubber tubing. This sleeve or tube 29 is tightly held by a clamping portion of the slide 14, which will now be described.

A flat sleeve 30 forms the portion of the slide 14 which engages the bar 7. One side wall of this sleeve 30 is provided at one of its ends with a projecting lug 31 which is integral with said wall. The other end of this wall is provided with an integral tongue 32 which is bent inwardly upon said side wall and extends longitudinally of the sleeve 30 into overlapping relation with the lug 31. Tongue 32 is provided with a downwardly bowed portion 33, and the tube or sleeve 29 is received between said portion 33 and the sleeve 30. A clamping screw 34 passes through the free end of the tongue 32 and is threaded into the lug 31 and upon tightening of this screw to a greater or less extent, the yieldable sleeve 29 may be contracted more or less, causing it to hold the shaft 24 with any desired degree of friction. Consequently, this friction hinge means for supporting the panel 15 will hold the latter in any of various positions to which it may be swung. To hold the slide 14 adjusted along the bar 7, a set screw 35 is employed.

The slide 13 embodies a flat sleeve 36 slidable along the bar 7, the ends of one side wall of said sleeve being provided with integral tongues 37 and 38 which are bent inwardly at said one side of the sleeve and have their terminals extended downwardly at 39 to provide a spring clip for engagement with a part carried by the panel 15, to hold the latter in raised position when desired.

The traffic mirror 16 and the glare shield 17 may be hinged to the lower edge of the plate 21 in any desired way. Merely for illustrative purposes, I have shown the aforesaid parts 16 and 17 provided with hinge knuckles 41 which co-act with knuckles 42 on the plate 21, and with a pintle 43, in hingedly supporting said parts 16 and 17. One of the knuckles 42, in the present showing, is gripped by the clip or the like 39 when the panel is swung upwardly to the position shown in Fig. 3. Another of these knuckles may be held by the clip if the panel be shifted transversely of the car in setting it for most convenient use. Such shifting of the panel is allowed, due to slidability of the shaft 24 in the sleeve 29.

By providing the novel construction shown and described, or a substantial equivalent thereof, a very convenient device is provided, and while the details disclosed are preferred, attention is again invited to the fact that within the scope of the invention as claimed, variations may be made.

I claim:—

1. In a device of the class described, a horizontal bar and means for mounting it longitudinally under the front portion of an automobile top, a slide adjustable longitudinally of said bar and having a bearing transverse to the latter, a horizontally elongated rod transverse to said bar and frictionally received in said bearing for rotative adjustment and for sliding to the right or left with respect to said slide, a support secured to said rod and adapted to be swung downwardly, and a panel pivoted to the lower end of said support on an axis parallel with said rod, said panel being downwardly swingable from said support when the latter is either raised or lowered.

2. An automobile attachment comprising a horizontal bar adapted for mounting immediately under the ceiling of an automobile body, a flat sleeve slidable along said bar and having a projecting integral lug at one end of one of its side walls, an elongated tongue integral with the other end of said side wall, said tongue being folded inwardly, extending longitudinally of said one side wall and being in overlapped relation with said lug, a portion of said tongue being bowed away from said side wall, a panel having a hinge shaft received between said bowed tongue portion and said one side wall, and a threaded fastener securing the free end of said tongue to said lug for drawing the former toward the latter.

3. An automobile attachment comprising a horizontal bar adapted for mounting immediately under the ceiling of an automobile body, a flat sleeve slidable along said bar and having a projecting integral lug at one end of one of its side walls, an elongated tongue integral with the other end of said side wall, said tongue being folded inwardly, extending longitudinally of said one side wall and being in overlapping relation with said lug, a portion of said tongue being bowed away from said side wall, a yieldable tube received between said bowed tongue portion and said side wall, a threaded fastener securing the free end of said tongue to said lug for inwardly springing said tongue to contract said tube, and a panel having a hinge shaft passing through and yieldably gripped by said tube.

4. In a device of the class described, a horizontal bar and means for mounting it longitudinally under the front portion of an automobile top, a slide adjustable longitudinally of said bar, a panel support under said slide and bar, combined pivotal and slidable means mounting said panel support on said slide for straight shifting to the right or left with respect to said slide and for vertical swinging, and a panel pivoted to the lower end of said panel support on an axis parallel to the pivotal axis of said support.

5. An automobile attachment comprising a horizontal bar and means for mounting it under the front portion of an automobile top, a sleeve movable along said bar, resilient fingers projecting downwardly from said sleeve, said fingers having their free ends curved laterally away from each other, a slide spaced longitudinally of said bar from said sleeve and movable along said bar, a panel hinged to said slide, and a second panel hinged to the first panel, part of the hinge of said second panel being adapted for reception between said fingers to hold the two panels raised when desired.

In testimony whereof I affix my signature.

ARTHUR H. ELLIS.